United States Patent
Bowman et al.

(10) Patent No.: US 8,186,517 B2
(45) Date of Patent: May 29, 2012

(54) STRAINER HOUSING ASSEMBLY AND STAND FOR PUMP

(75) Inventors: Joel Brent Bowman, Winston-Salem, NC (US); Dwayne Emory Clark, Summerfield, NC (US); Ronald H. Griffin, Boonville, NC (US); Fred Hazlehurst, Union, NJ (US)

(73) Assignee: Hayward Industries, Inc., Elizabeth, NJ (US)

( * ) Notice: Subject to any disclaimer, the term of this patent is extended or adjusted under 35 U.S.C. 154(b) by 212 days.

(21) Appl. No.: 12/270,349

(22) Filed: Nov. 13, 2008

(65) Prior Publication Data
US 2009/0145498 A1 Jun. 11, 2009

Related U.S. Application Data

(63) Continuation-in-part of application No. 11/541,924, filed on Sep. 29, 2006, now Pat. No. 7,531,092.

(60) Provisional application No. 60/732,008, filed on Nov. 1, 2005.

(51) Int. Cl.
*F04D 29/70* (2006.01)
*B01D 35/02* (2006.01)
(52) U.S. Cl. .................. 210/416.2; 210/238; 415/121.2
(58) Field of Classification Search ............... 210/167.1, 210/232, 238, 416.1, 416.2; 415/121.2
See application file for complete search history.

(56) References Cited

U.S. PATENT DOCUMENTS

| | | |
|---|---|---|
| D131,875 S | 3/1942 | Houston |
| 3,468,260 A | 9/1969 | Belden |
| 3,637,331 A | 1/1972 | Smith et al. |
| 3,744,635 A | 7/1973 | Horvath |
| 3,920,352 A | 11/1975 | Speck et al. |

(Continued)

FOREIGN PATENT DOCUMENTS

EP 0657602 A1 6/1995

(Continued)

OTHER PUBLICATIONS

U.S. Appl. No. 60/732,439, Title: Strainer Basket, filed Oct. 31, 2005, Inventor: Jeffrey Pecca (24 pages).

(Continued)

*Primary Examiner* — Fred Prince
(74) *Attorney, Agent, or Firm* — McCarter & English, LLP (57) ABSTRACT

A pump for use with a fluid circulation system for a recreational water body is disclosed. The pump includes a strainer housing, an impeller housing integrally formed with respect to the strainer housing, and an impeller cover mounted with respect to the impeller housing. The strainer housing includes a top portion having an outer surface adapted to engage with a strainer housing cover for mounting the strainer housing cover with respect to the strainer housing. A plurality of cams are formed circumferentially with respect to the outer surface of the top portion of the strainer housing. The cams are configured and dimensioned to cooperate with corresponding cam members formed with respect to an inner surface of the strainer housing cover. A positioning tab is formed with respect to the top portion of the strainer housing for appropriate alignment of the strainer housing cover. A positioning notch is formed with respect to the inner surface of the strainer housing cover. The notch cooperates with the tab to ensure proper strainer housing cover alignment. A stand is provided that defines a receiving chamber for receiving a securing feature that is mounted with respect to downwardly extending base portions associated with an impeller housing and an impeller cover.

18 Claims, 6 Drawing Sheets

U.S. PATENT DOCUMENTS

| | | | |
|---|---|---|---|
| 3,966,363 A | 6/1976 | Rowley et al. |
| D255,480 S | 6/1980 | Zieg |
| 4,242,064 A | 12/1980 | Uncles |
| 4,269,557 A | 5/1981 | Kidd |
| 4,287,067 A | 9/1981 | Dyner |
| 4,353,846 A | 10/1982 | Mehrens et al. |
| 4,473,470 A | 9/1984 | Loutit |
| 4,629,557 A | 12/1986 | Tobias |
| 4,773,823 A | 9/1988 | Pease |
| 4,783,260 A | 11/1988 | Kurihara |
| D299,143 S | 12/1988 | Hazlehurst |
| 4,871,303 A | 10/1989 | Roesler |
| 4,898,513 A | 2/1990 | Hon |
| 5,156,535 A | 10/1992 | Budris et al. |
| 5,409,606 A | 4/1995 | Spencer |
| 5,624,559 A | 4/1997 | Levin et al. |
| 5,858,234 A | 1/1999 | Sukun |
| 5,897,787 A | 4/1999 | Keller |
| D419,567 S | 1/2000 | Weiss |
| 6,041,453 A | 3/2000 | Barrow et al. |
| D425,911 S | 5/2000 | Fleischer et al. |
| 6,149,407 A | 11/2000 | Laing |
| 6,187,179 B1 * | 2/2001 | Mayer et al. | 210/109 |
| 6,287,466 B1 | 9/2001 | Yassin |
| D450,106 S | 11/2001 | Herr |
| D450,327 S | 11/2001 | Mori et al. |
| 6,379,127 B1 | 4/2002 | Andrews et al. |
| D466,522 S | 12/2002 | Huang |
| 6,554,587 B2 | 4/2003 | Paolini et al. |
| 6,623,245 B2 | 9/2003 | Meza et al. |
| 6,659,717 B1 | 12/2003 | Kao |
| 6,716,348 B1 * | 4/2004 | Morgan | 210/232 |
| 6,824,354 B2 | 11/2004 | Laing |
| D507,579 S | 7/2005 | Rossman et al. |
| 6,939,463 B2 | 9/2005 | Leaverton |
| 6,955,637 B1 | 10/2005 | Montano et al. |
| 6,974,303 B2 | 12/2005 | Wang |
| 7,001,159 B2 | 2/2006 | Peterson, Jr. et al. |
| D517,570 S | 3/2006 | Stiles, Jr. et al. |
| 7,063,791 B2 | 6/2006 | Miner |
| 7,083,392 B2 | 8/2006 | Meza et al. |
| D536,705 S | 2/2007 | Griffin et al. |
| 7,191,998 B1 | 3/2007 | Chalberg et al. |
| 7,223,337 B1 | 5/2007 | Franzino et al. |
| D550,805 S | 9/2007 | Hazlehurst |
| D551,256 S | 9/2007 | Pecca et al. |
| D557,374 S | 12/2007 | Pecca |
| D568,340 S | 5/2008 | Stiles, Jr. et al. |
| D588,159 S | 3/2009 | Griffin et al. |
| D590,842 S | 4/2009 | Clark et al. |
| 7,531,092 B2 | 5/2009 | Hazlehurst |
| 7,686,587 B2 | 3/2010 | Koehl |
| 7,686,589 B2 | 3/2010 | Stiles, Jr. et al. |
| 7,878,766 B2 | 2/2011 | Meza et al. |
| 2001/0021613 A1 | 9/2001 | Fadeley et al. |
| 2003/0017055 A1 | 1/2003 | Fong |
| 2004/0009075 A1 | 1/2004 | Meza et al. |
| 2004/0091373 A1 | 5/2004 | Terry et al. |
| 2004/0149666 A1 | 8/2004 | Leaverton |
| 2005/0019154 A1 | 1/2005 | Dial |
| 2005/0084401 A1 | 4/2005 | Coray et al. |
| 2005/0095150 A1 | 5/2005 | Leone et al. |
| 2005/0100455 A1 | 5/2005 | Tuddenham |
| 2005/0118039 A1 | 6/2005 | Shorten et al. |
| 2005/0158194 A1 | 7/2005 | Sloan et al. |
| 2006/0088423 A1 | 4/2006 | Brunet et al. |
| 2006/0204367 A1 | 9/2006 | Meza et al. |
| 2007/0114162 A1 | 5/2007 | Stiles et al. |
| 2007/0154319 A1 | 7/2007 | Stiles, Jr. et al. |
| 2007/0154320 A1 | 7/2007 | Stiles, Jr. et al. |
| 2007/0154321 A1 | 7/2007 | Stiles, Jr. et al. |
| 2007/0154322 A1 | 7/2007 | Stiles, Jr. et al. |
| 2007/0154323 A1 | 7/2007 | Stiles, Jr. et al. |
| 2007/0163929 A1 | 7/2007 | Stiles, Jr. et al. |
| 2007/0183902 A1 | 8/2007 | Stiles, Jr. et al. |
| 2008/0079259 A1 | 4/2008 | Parcell |
| 2008/0086810 A1 | 4/2008 | Le |
| 2008/0181786 A1 | 7/2008 | Meza et al. |
| 2008/0181788 A1 | 7/2008 | Meza et al. |
| 2008/0181790 A1 | 7/2008 | Meza et al. |
| 2009/0064406 A1 | 3/2009 | Lawyer et al. |
| 2009/0320202 A1 | 12/2009 | Lawyer et al. |
| 2010/0115715 A1 | 5/2010 | Ortiz et al. |
| 2010/0146696 A1 | 6/2010 | Campbell et al. |
| 2010/0247332 A1 | 9/2010 | Stiles, Jr. et al. |
| 2010/0254825 A1 | 10/2010 | Stiles, Jr. et al. |
| 2011/0076156 A1 | 3/2011 | Stiles, Jr. et al. |

FOREIGN PATENT DOCUMENTS

| | | |
|---|---|---|
| EP | 1267085 A2 | 12/2002 |
| JP | 06341398 | 12/1994 |
| WO | WO 00/68575 | 11/2000 |

OTHER PUBLICATIONS

Sta-Rite® Owner's Manual for the Max-E-Glass II™ and Dura-Glass II™ Centrifugal Pumps with Integral Trap (2003) (19 pages).

Sta-Rite® Basket C8-58P (2003) (Perspective and Six Orthogonal View Photographs) (7 pages).

Pages from various Internet sources printed on Oct. 25, 2005 (17 pages).

Textron, Inc., Various Textron Busings Printouts from http://www.avdel.textron.com (at least as early as Jan. 2006) (5 pages).

Hayward Buyer's Guide and Parts Price List, effective Dec. 29, 2003 (4 pages).

* cited by examiner

STRAINER HOUSING ASSEMBLY AND STAND FOR PUMP

CROSS-REFERENCE TO RELATED APPLICATIONS

The present application is a continuation-in-part of U.S. patent application Ser. No. 11/541,924, filed Sep. 29, 2006 (and published on May. 24, 2007 as U.S. Patent Application Publication No. 2007/0114168), now U.S. Pat. No. 7,531,092, which claims the benefit under 35 U.S.C. §119(e) of U.S. Provisional Application No. 60/732,008, filed Nov. 1, 2005, and each of the foregoing U.S. patent applications and U.S. patent application publication is incorporated herein by reference for all purposes.

BACKGROUND

1. Technical Field

The present disclosure relates to pumps and, more particularly, to pumps for use in connection with fluid circulation systems for swimming pools, spas, whirlpools and other recreational bodies of water.

2. Background Art

Numerous pumps have been developed for use in connection with fluid circulation systems, e.g., for swimming pools, spas, whirlpools and the like. Since a pump is the heart of a fluid circulation system, it should function optimally at all times so as to provide users with the maximum amount of use and enjoyment of the associated swimming pool, spa, etc. Consequently, any required replacement, repair or maintenance of the pump and its associated components must be conducted quickly and efficiently in order to reduce any downtime of the system, as well as to reduce any associated labor costs. Because various components of conventional pumps are assembled by threads, bolts or the like, assembly and disassembly of such pumps are often time-consuming, inefficient and costly.

Pumps generally incorporate fluid-sealing couplings adapted to retain fluid under pressure during equipment operation. Such couplings are also often designed to facilitate disassembly and reassembly of the equipment (e.g., to inspect and replace internal equipment components when the equipment is not in operation). In many instances, properly assembled couplings apply a predetermined level of compression on a sealing element (e.g., a washer or gasket) to prevent fluid from leaking out of the coupling.

In order to disassemble and properly reassemble conventional pumps, it is frequently necessary to use special tools. In addition, assembly/disassembly is not always intuitive, raising the potential for incorrect or incomplete operative actions. In instances where special tools are not available or where the equipment user fails to appreciate/understand the coupling-related requirements, the coupling may be reassembled with improper alignment. For example, the application of insufficient torque on one or more coupling bolts, relative to a predetermined level, may result in fluid leakage at the coupling junction. Likewise, the application of too much torque on one or more housing bolts, relative to a predetermined level, may result in damage to the coupling seal (e.g., a crushed or crimped gasket/washer).

Conventional pumps are typically supported by a base that maintains the pump upright during operation. The base may also function to elevate the pump and its associated components above a potential water level. Often the base includes a rearwardly extending, detachable support member that is adapted to prevent undesirable movement and provide a level of stability to the pump. Although intended to provide effective support to the main pump unit, many pumps utilize and/or are provided with an inadequate support member, particularly when relatively violent movement/vibration is encountered. In other instances, the connection(s) between a support member and the base/underside of a conventional pump is not effective to impart desired stability during pump operation.

Accordingly, a need exists for a pump assembly that facilitates effective and reliable assembly, disassembly and reassembly. A need also exists for pump designs that provide an effective and reliable seal, while providing periodic access to the internal components associated therewith. In addition, a need exists for pump assemblies that include and/or are adapted to interact with base units that stabilize and support the pump in an effective manner. These and other needs are addressed and/or limitations of conventional designs overcome by the apparatus, assemblies and methods of the present disclosure.

SUMMARY

The present disclosure provides a pump for use with a fluid circulation system, particularly a fluid circulation system associated with a recreational water body. In an exemplary embodiment, the pump includes a strainer housing that defines a cavity or internal region for receiving a strainer, and a strainer housing cover that is adapted to be removably mounted with respect to the strainer housing. The strainer housing cover is configured and dimensioned to form a seal with respect to the strainer housing. A top portion of the strainer housing generally defines an opening that is adapted to allow access to the cavity defined therewithin, e.g., to introduce and/or access a strainer basket positioned in the strainer housing.

An outer, peripheral surface of the strainer housing is adapted to cooperate with the strainer housing cover. More particularly, a plurality of cam members are integrally formed with respect to the outer peripheral surface of the strainer housing, e.g., radially outward of the opening defined in the top portion of the strainer housing. The cam members are adapted to align and interact with cooperating cam members formed along an inner surface of the strainer housing cover. In addition, the strainer housing cover generally includes or defines at least a pair of diametrically opposed handles extending radially outwardly with respect to the cover. The handles facilitate imparting rotational movement to the strainer housing cover relative to the strainer housing, e.g., to assemble or disassemble the cover relative to the housing.

The pump may also include additional structures, features and/or functions that facilitate the design and/or operation thereof. For example, the pump generally includes an inlet formed on a front side of the strainer housing that is adapted to allow fluid to enter the strainer housing. An impeller housing cooperates with the strainer housing and generally defines an outlet on a top side or surface thereof. The impeller housing is integrally formed with respect to the strainer housing and is adapted to receive and encase a rotationally mounted impeller. An impeller cover is typically removably mounted with respect to the impeller housing. The impeller cover generally includes a base portion that extends downwardly and is adapted to abut against a corresponding base portion of the impeller housing.

In an exemplary embodiment, the outer surface of the top portion of the strainer housing includes three (3) cam members that are integrally formed with respect to the outer surface thereof. Typically, the cam members are substantially elongated circumferentially with respect to the outer surface and positioned substantially equidistant from one another around the circumference of the strainer housing. The strainer housing cover includes three cooperating cam members that correspond and are aligned with the foregoing strainer housing cam members. Thus, to achieve the desired cooperation, the cam members formed with respect to the outer surface of the strainer housing generally protrude radially outwardly with respect to the outer surface of the strainer housing, and the cooperating cam members formed with respect to the inner surface of the strainer housing cover extend radially inwardly with respect thereto. The respective cam members are ramped to facilitate camming interaction therebetween. The interacting cam members are thus configured and dimensioned to allow the strainer housing cover to be mounted with respect to the strainer housing and form a seal therewith when the cover is rotated into a closed position.

An exemplary strainer housing cover according to the present disclosure includes a lid element that is fabricated, in whole or in part, from a substantially transparent or opaque material, thereby permitting visualization of the interior region therebelow. The strainer housing cover may include an outer frame that includes the camming members and diametrically opposed handles, and that defines an interior opening. A transparent/translucent lid is configured and dimensioned to be mounted with respect to the frame, e.g., through notches formed in the interior opening that cooperate with extension lips formed on the lid. The lid may define a circumferential flange-like portion that is adapted to engage/abut the underside of the frame and seal thereagainst when the lid/frame are mounted with respect to each other. The flange-like portion also advantageously defines a substantially U-shaped undersurface that is adapted to receive a circumferential rim associated with the strainer housing, thereby facilitating sealing interaction therebetween.

In an exemplary embodiment associated with the present disclosure, the outer surface of the strainer housing further includes a positioning tab or protuberance that is integrally formed with respect thereto. Typically, the positioning tab corresponds to and is adapted to align with a positioning notch formed with respect to the inner surface of the strainer housing cover. The positioning notch is generally defined in one of the cam members formed on the cover, e.g., at a midpoint thereof. In an exemplary embodiment, the positioning tab protrudes radially outward and cooperates with the positioning notch of the strainer housing cover, whereby only one aligned orientation is accommodated when mounting the strainer housing cover with respect to the strainer housing. By locating the positioning tab at or near a midpoint between cam members formed on the strainer housing, alignment of the strainer housing and cover is facilitated. Typically, the proper orientation for mounting the strainer housing cover with respect to the strainer housing is such that the diametrically opposed handles associated with the strainer housing cover are perpendicularly positioned with respect to the pump's central axis when the cover is rotated into its final, sealed position. For purposes of the present disclosure, the pump axis is parallel to the impeller shaft. Thus, the positioning notch/tab are positioned such that the diametrically opposed handles are initially angled relative to the pump's central axis, e.g., aligned at an angle of about 10°-20° relative to such central axis.

The strainer housing and the impeller housing generally cooperate such that the strainer housing extends substantially vertically and the impeller housing extends substantially horizontally. Typically, a flow path is defined internally with respect to the strainer housing and the impeller housing. The flow path is adapted to allow fluid communication between the strainer housing and the impeller housing. Exemplary strainers for introduction into the strainer housing define a plurality of holes of a predetermined average dimension. The plurality of holes are generally deployed in a substantially mesh configuration. The strainer is adapted to allow fluid to pass through the strainer housing, while preventing items that exceed the predetermined average dimension of the plurality of holes from passing through to the impeller housing. The strainer defines an inlet opening formed on a front side thereof. The strainer's inlet opening is adapted to cooperate with the inlet formed on the strainer housing. In an exemplary embodiment, the strainer includes a ridge and an alignment fin that cooperates with a pair of alignment features defined on the inner surface of the strainer housing. The ridge and alignment fin are adapted to properly position the strainer within the strainer housing.

In use, the strainer cover is brought into engagement with the strainer housing by aligning the positioning tab with the corresponding positioning notch and bringing the U-shaped underside of the cover lid into engagement with the circumferential rim of the strainer housing. At this point, a positive pressure within the strainer housing would cause the cover to disengage from the strainer housing, i.e., a seal is not yet formed therebetween. The user rotates the cover relative to the strainer housing, generally clockwise, such that the cooperating camming members are brought into engagement. The cooperative ramping of such camming members brings the cover into tight engagement with the strainer housing. Rotational motion of the cover relative to the strainer housing is generally limited by tolerancing between the camming members and an outwardly directed ridge member formed on the strainer housing. Thus, the camming members bring the cover into an interference engagement with such outwardly directed ridge member, thereby preventing further rotational motion of the cover and effecting sealing engagement between the cover and the strainer housing. More particularly, the seal is effected between the U-shaped underside of the lid and a corresponding rim of the strainer housing, which are firmly secured relative to each other through the camming structures described herein. Of note, the inclusion of three camming members, as described herein, substantially improves the sealing effect described herein, as sealing forces are well distributed and balanced during pump operation.

In a further exemplary embodiment of the present disclosure, a pump is provided that includes a stand that is adapted to: (i) be removably mounted with respect to base portions of the impeller housing and the impeller cover; and (ii) support the motor that drives the impeller. The stand typically includes a flange portion adapted to abut against the base portion of the impeller cover. The flange portion defines at least one receiving chamber adapted to receive at least one base securing feature for removably mounting the stand with respect to the base portion of the impeller cover. The at least one base securing feature passes through the base portions of the impeller housing and the impeller cover, and engages the at least one receiving chamber defined with respect to the motor stand. The stand advantageously provides structural support and imparts stability to the complete pump assembly.

Additional features, functions and benefits of the disclosed structures and assemblies will be apparent from the description which follows, particularly when read in conjunction with the appended figures.

BRIEF DESCRIPTION OF THE DRAWINGS

For a more complete understanding of the structures, assemblies and methods of the present disclosure, reference is made to the following detailed description of exemplary embodiment(s) considered in conjunction with the accompanying drawings, in which.

DESCRIPTION OF EXEMPLARY EMBODIMENT(S)

Pump and pump assemblies for use with fluid circulation systems are disclosed herein. Particular pump applications include fluid circulation systems associated with recreational water bodies, e.g., pools, spas, hot tubs, whirlpools and the like. Typical pumps/pump assemblies according to the present disclosure include a strainer housing for receiving a strainer, and a removable strainer housing cover that is adapted to cooperate and to form a seal therewith. Advantageous cover/strainer housing subassemblies are provided that effectively and reliably interact and sealingly engage, while permitting ready access to the cavity defined within the strainer housing, e.g., to introduce and/or access a strainer basket positioned therewithin.

Figure 1:
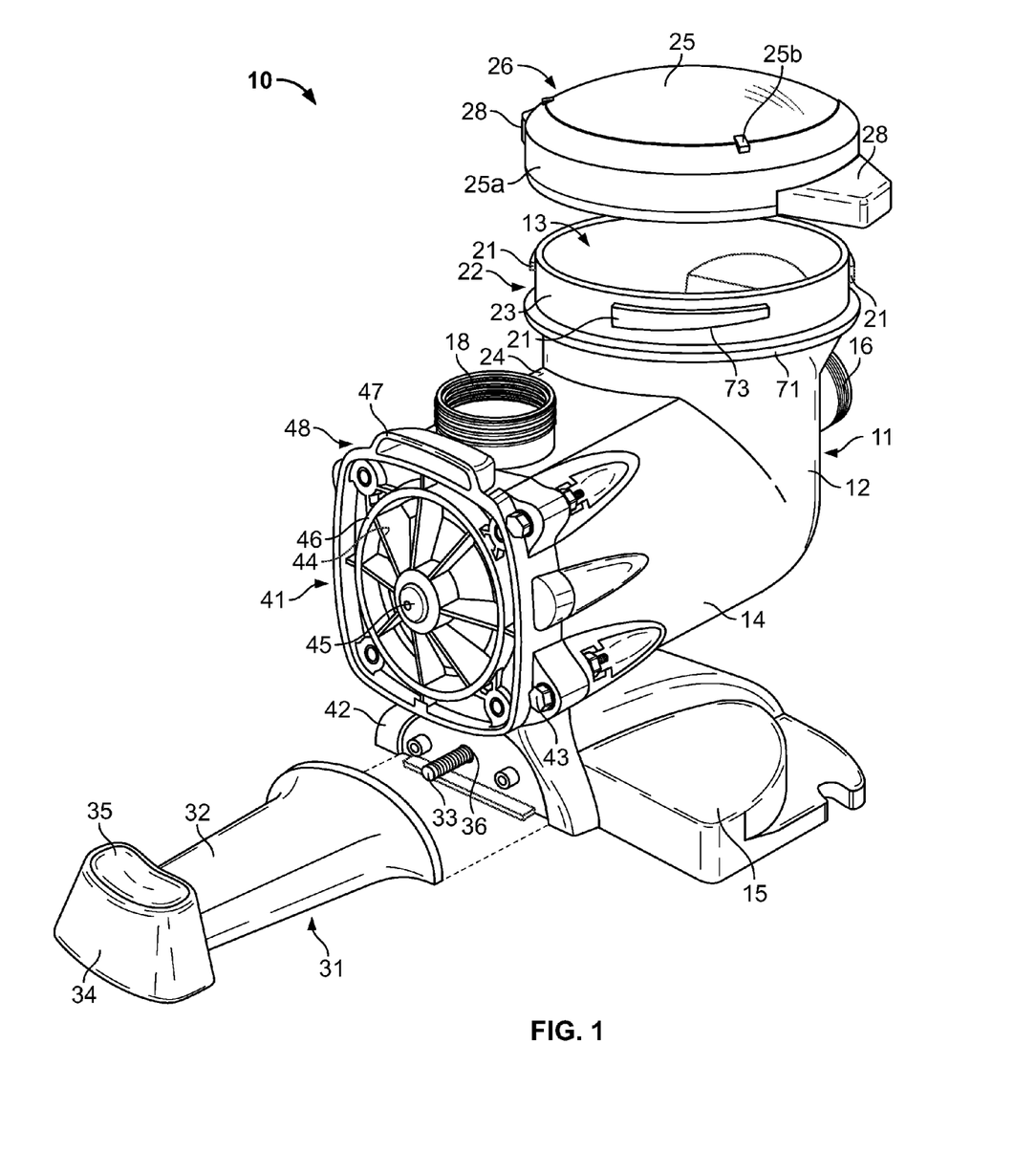
FIG. 1 is a perspective, partially exploded view of an exemplary pool pump associated with the present disclosure.

FIG. 1 provides a perspective view of an exemplary pool pump 10 according to the present disclosure. Pool pump 10 includes a strainer housing 12 integrally formed with impeller housing 14. Typically, strainer housing 12 and impeller housing 14 define a substantially perpendicular relationship relative to each other, with strainer housing 12 extending substantially upwardly (vertically) with respect to base 15, and impeller housing 14 extending substantially rearwardly (horizontally) with respect to strainer housing 12. Impeller housing 14 thus defines a central axis that is substantially horizontal based on the orientation of pool pump 10 in FIG. 1 and aligns with the impeller shaft (not pictured) that extends therethrough.

Figure 4:
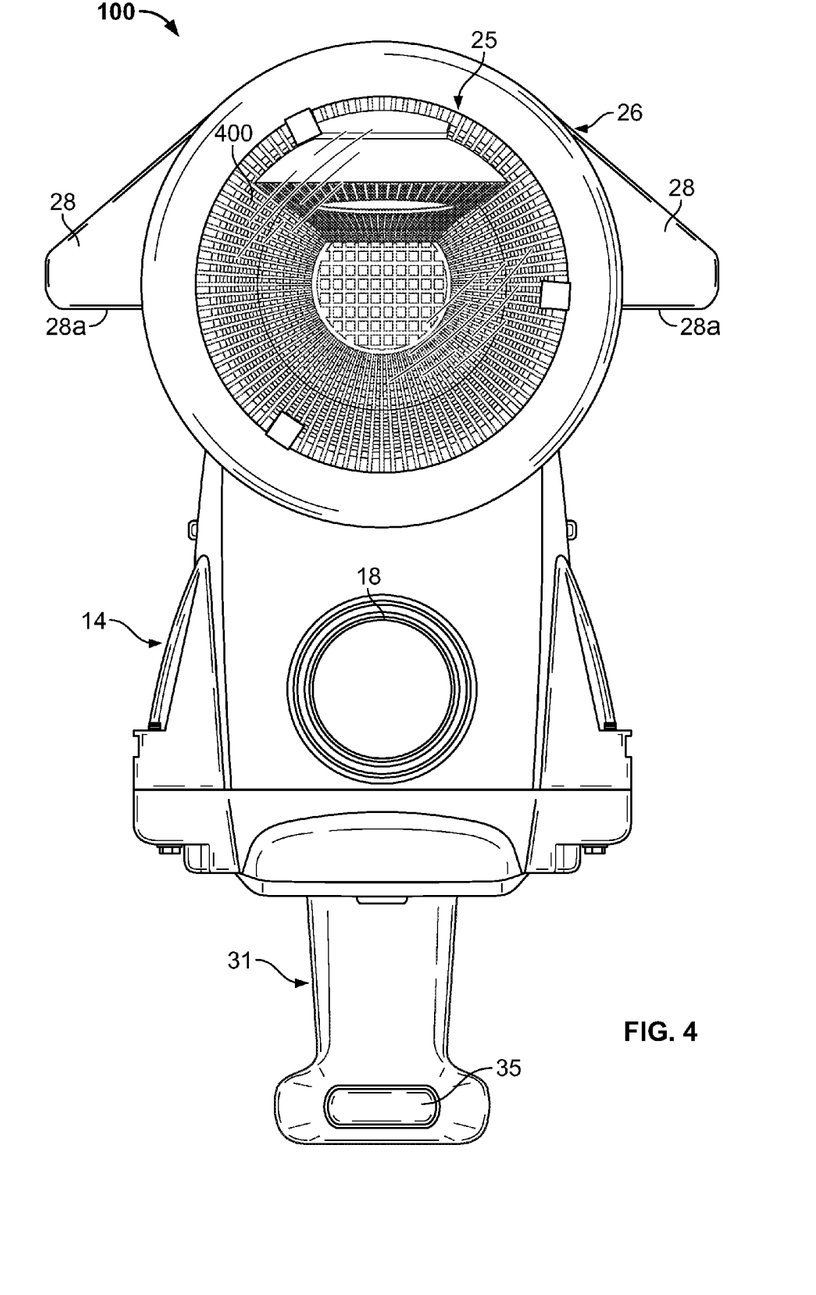
FIG. 4 is a top side view as shown in FIG. 3 with the cover mounted with respect to the strainer housing in a closed and substantially sealed position.
Figure 5:
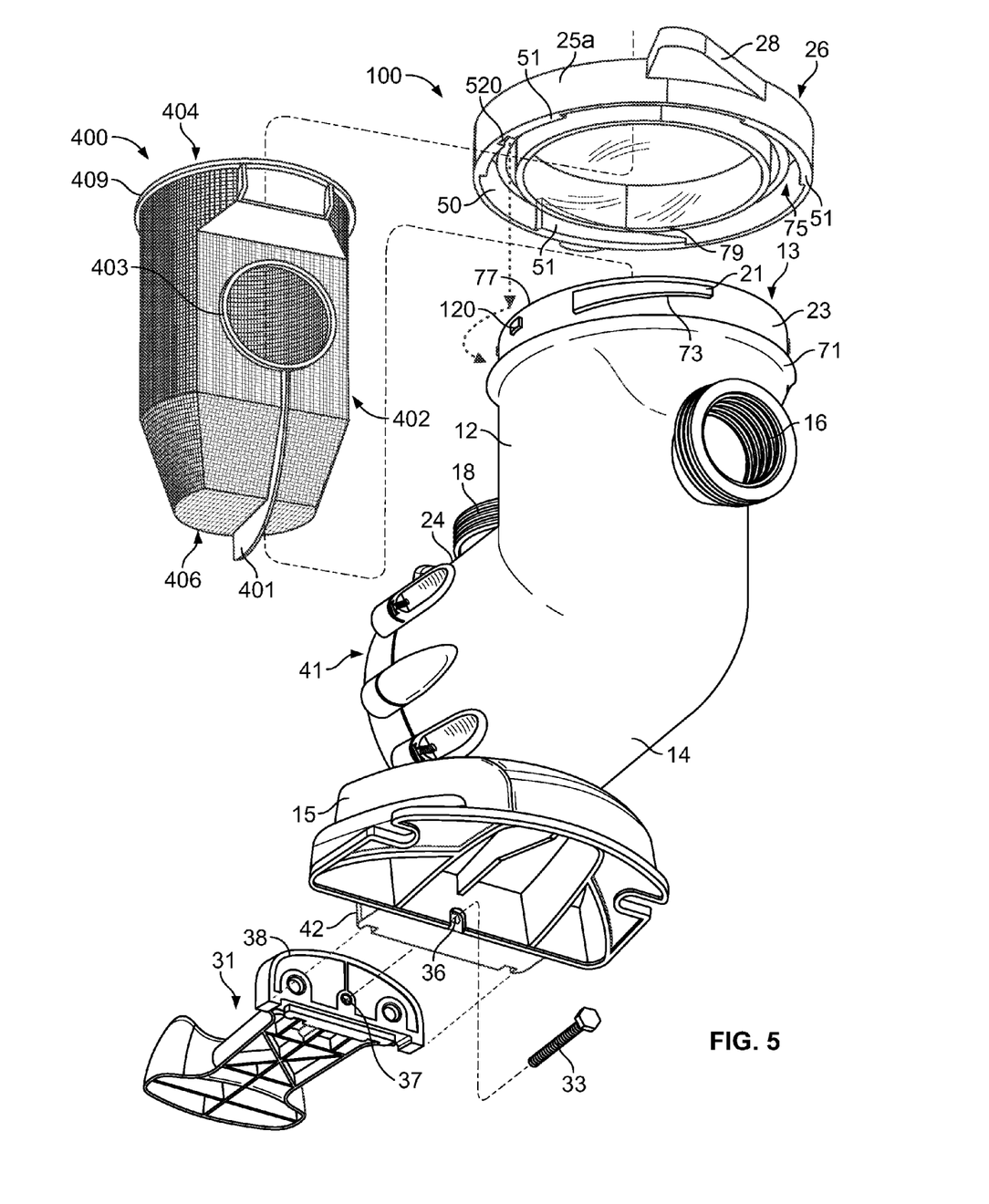
FIG. 5 is a perspective, partially exploded bottom side view of an exemplary pool pump associated with the present disclosure, including an exemplary strainer.
Figure 6:
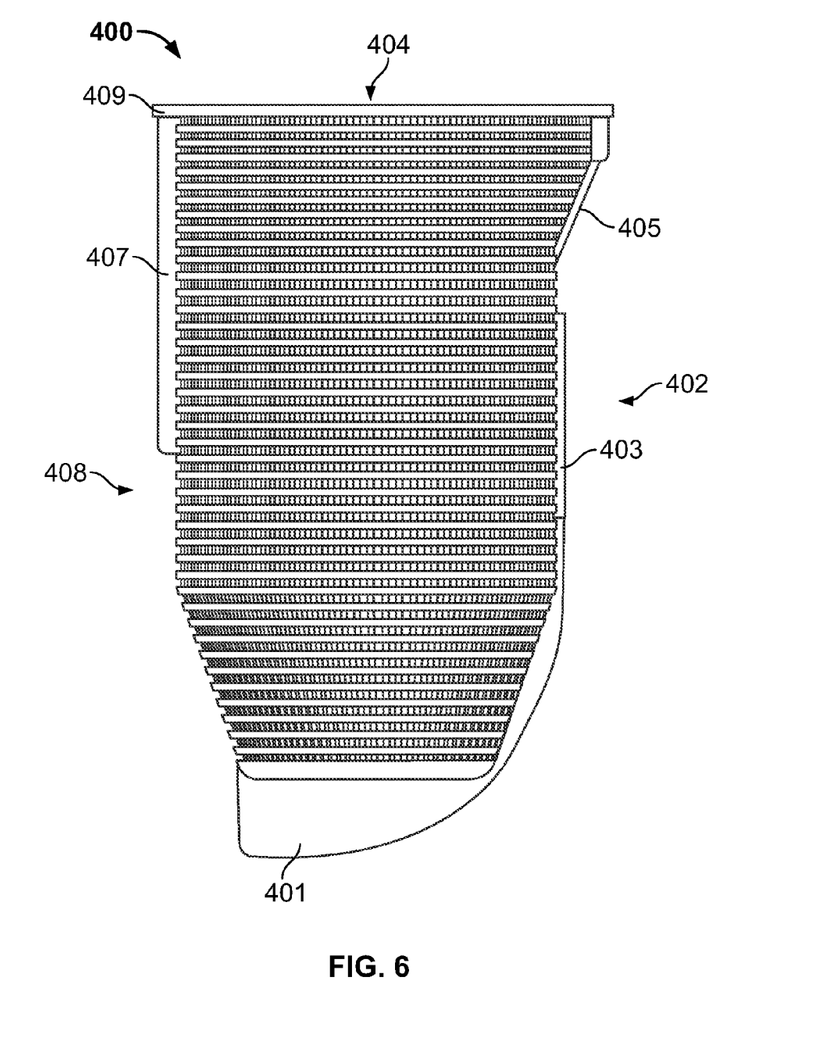
FIG. 6 is a side view of an exemplary strainer associated with the present disclosure.

Strainer housing 12 defines a cavity 13 that is adapted to receive a strainer unit (shown in FIGS. 4-6; also referred to as a strainer). The strainer/strainer unit is discussed in greater detail below. In an exemplary embodiment, strainer housing 12 includes a top portion 22 that defines an opening to access cavity 13. Top portion 22 also defines a substantially circular geometry and includes an outer surface 23. An outwardly extending ridge member 71 is molded onto the outer surface of strainer housing 12 and extends around the circumference thereof. A plurality of securing cam members 21 (also referred to as cams or ramps) protrude radially outwardly and extend circumferentially along surface 23. The cams define a ramped surface 73 that facilitates interaction with cooperating cams formed on strainer cover 26, as described below. In an exemplary embodiment, strainer housing 12 includes three ramped cams 21. In a further exemplary embodiment, the three cams 21 are spaced circumferentially equidistant from each other around the periphery of strainer housing 12.

Cams 21 interact with a strainer cover 26 to securely form a seal therebetween. Indeed, strainer housing 12 and strainer cover 26 interact such that leakage and/or pressure loss is substantially prevented during pump operation. An exemplary strainer cover 26 defines a substantially circular geometry and is adapted to be removably/detachably mounted with respect to outer surface 23 of strainer housing 12. In an exemplary embodiment, strainer cover 26 includes a pair of radially extending handles 28 that are typically diametrically opposed relative to each other. Handles 28 are adapted to allow for effective rotation of strainer cover 26 relative to strainer housing 12, thus allowing a user to effectively alternate strainer cover 26 from an open to a closed position (i.e., engaging and disengaging cams 21). As best seen in FIG. 4, exemplary handles 28 define a substantially trapezoidal geometry, with side faces 28a that are substantially aligned and that define a line that is slightly offset relative to the center of the strainer housing opening. Side faces 28a are the primary surfaces grasped by a user when rotating strainer cover 26 relative to strainer housing 12, e.g., for assembly/disassembly thereof.

Strainer cover 28 is rotatable relative to strainer housing, and is adapted to move between an open/non-sealed orientation and a closed/sealed orientation. In an exemplary embodiment, strainer cover 26 includes a frame 25a and a lid 25. Lid 25 is typically made from a transparent material, but it can be made from opaque material. Lid 25 can be formed from a plastic material, reinforced plastic material, and the like. Lid 25 is adapted to mount with respect to frame 25a. In an exemplary embodiment, lid 25 defines circumferentially spaced tabs 25b that interact with corresponding notches formed in frame 25a for alignment/engagement therebetween.

With reference to FIG. 5, frame 25a defines a U-shaped channel 75 in an underside surface thereof U-shaped channel 75 is configured and dimensioned to surround upper rim 77 of strainer housing 12 when cover 26 is brought into cooperation therewith. Of note, the depth of U-shaped channel 75 is typically sized such that frame 25a is spaced from cams 21 when cover 26 is brought into engagement with strainer housing 12. U-shaped channel 75 is adapted to rotationally slide relative to upper rim 77 as strainer cover 26 is brought into sealing engagement with strainer housing 12. In addition, it is noted that the ultimate seal between strainer cover 26 and strainer housing 12 is effected between lid 25 of strainer cover 26 and rim 77 of strainer housing 12 within U-shaped channel 75.

In an exemplary embodiment, an inlet 16 is formed on front side 11 of strainer housing 12. Inlet 16 extends outwardly with respect to strainer housing 12 and typically defines a substantially circular opening. In an exemplary embodiment, inlet 16 includes a plurality of outer threads and inner threads (shown in FIG. 5) for secure coupling with respect to any typical fluid delivery system such as a hose, pipe, tube or the like. During pump operation, fluid, such as pool water, passes through inlet 16 and into strainer housing 12.

Base 15 is integrally formed extending downwardly with respect to impeller housing 14. A Base 15 is often referred to as a stand and supports pump 10 in an upright/stable orientation during pump operation. An outlet 18 is formed on a top side 24 of impeller housing 14. Typically, outlet 18 extends upwardly with respect to impeller housing 14 and defines a substantially circular opening. In an exemplary embodiment, outlet 18 includes a plurality of outer threads and inner threads for secure coupling with respect to any typical fluid delivery system such as a hose, pipe, tube or the like. During pump operation, fluid, such as pool water, passes through inlet 16, into strainer housing 12 for particle filtering, then into impeller housing 14 where the impeller (not shown) increases the pressure of the fluid for egress through outlet 18.

Pump 10 further includes an impeller cover 41 that is mounted with respect to impeller housing 14. Typically, impeller cover 41 is mounted with respect to impeller housing 14 by a plurality of securing features 43, e.g., screws, bolts or the like. When impeller cover 41 is secured/mounted with respect to impeller housing 14, a seal is formed thereby that substantially prevents fluid leakage and/or pressure loss.

A plurality of supporting ribs 44 are formed on impeller cover 41 that extend radially towards ring 46. Supporting ribs 44 provide additional structural support to impeller cover 41 during pump operation. Ring 46 is substantially circular and is adapted to align a motor (not shown) for operational engagement with pump 10. Thus, pump 10 generally works in cooperation with a conventional motor that drives the internal impeller within impeller housing 14, as is known in the art. Typically, the motor includes a drive shaft that passes through an opening 45 positioned substantially in the center of impeller cover 41, such drive shaft engaging the internal impeller to impart rotational force thereto.

An impeller cover base portion 42 is formed that extends downwardly with respect to impeller cover 41. Base portion 42 is adapted to provide additional stabilization to pump 10 when impeller cover 41 is mounted with respect to impeller housing 14. In an exemplary embodiment, a hole 36 is defined substantially in the center of base portion 42 and is adapted to allow a base securing feature 33 to pass through base portion 42. Base securing feature 33 advantageously secures a rearwardly extending stand 31 with respect to base portion 42. Stand 31 includes a main body 32 and a rear portion 34. In an exemplary embodiment, rear portion 34 defines a substantially curved top surface 35 that is adapted to host and/or support a motor assembly. Main body 32 extends rearwardly and horizontally with respect to base portion 42, defining a bottom surface to provide further stability to pump 10 during operation.

In an exemplary embodiment, pump 10 further includes a handle 47 integrally formed along a top side 48 of impeller cover 41. Typically handle 47 extends along a portion of top side 48 and defines an encased opening that is configured and dimensioned for receipt of a user's fingers, e.g., up to the first knuckle. The encased opening of handle 47 permits a user to effectively maneuver the pump 10. The central, integral positioning of handle 47 facilitates maneuvering/handling of pump 10 based, at least in part, on the weight balance that is encountered at either side of handle 47.

With further reference to FIGS. 2-5, an exemplary pool pump 100 associated with the present disclosure is schematically depicted. Pump 100 includes many of the same or structurally similar features as are shown and described with reference to exemplary pump 10. Accordingly, like features and structures are represented by like numbers. Pump 100 includes a strainer housing 12 formed with an impeller housing 14 that defines a substantially perpendicular relationship. Strainer housing 12 extends substantially vertically and includes a top portion 22 defining a substantially circular geometry. Top portion 22 includes a circumferential outer surface 23. A plurality of ramped cams 21 protrude radially with respect to outer surface 23 and are circumferentially spaced therearound. Ramps 73 facilitate interaction with cams formed on strainer cover 26.

Figure 2:
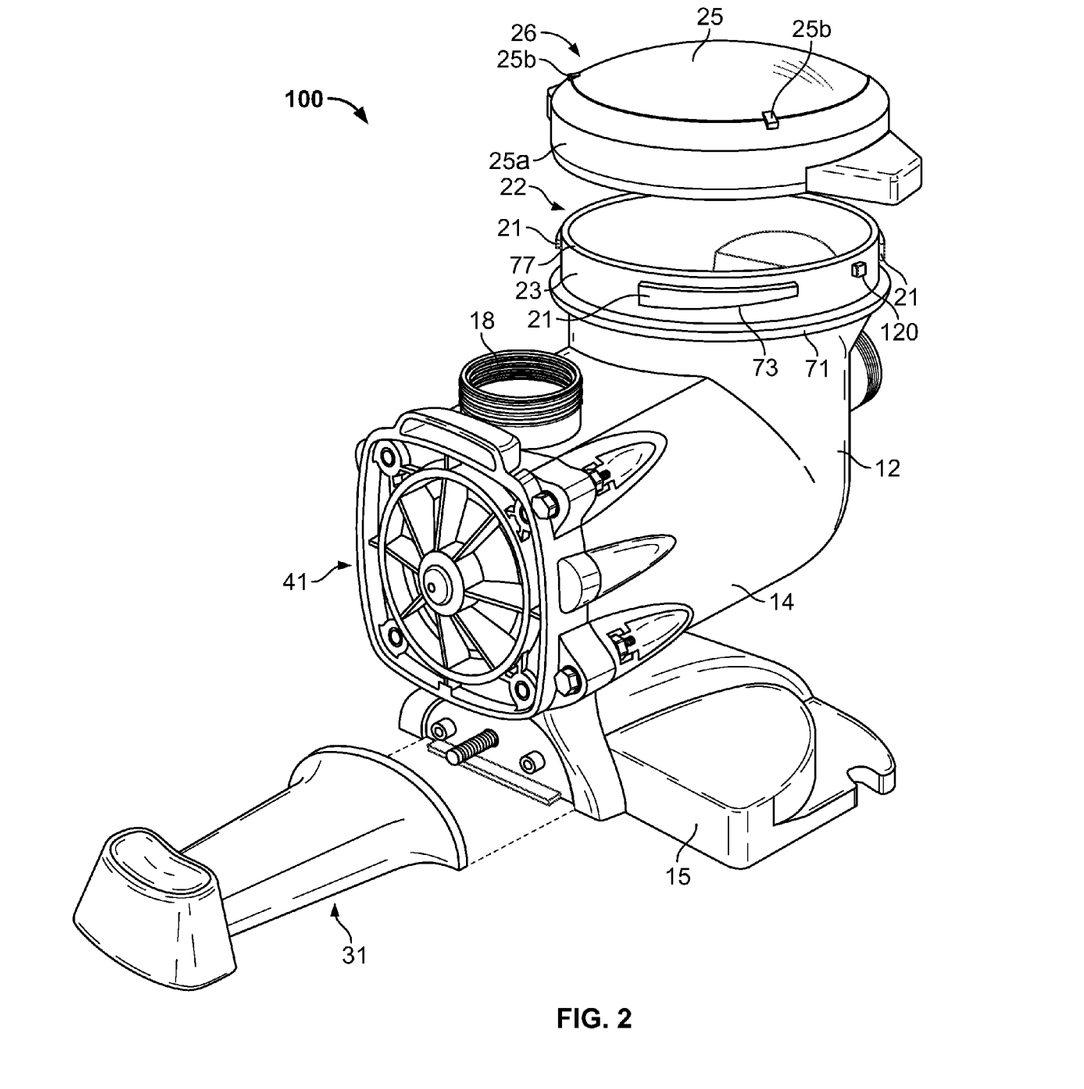
FIG. 2 is a perspective, partially exploded view of an exemplary pool pump associated with the present disclosure, including a positioning tab/notch.

In an exemplary embodiment, pump 100 further includes at least one positioning tab 120 (also referred to as a positioning feature) formed with respect to outer surface 23. Tab 120 protrudes radially with respect to outer surface 23. In an exemplary embodiment, tab 120 defines a substantially cubic geometry. In a further exemplary embodiment, tab 120 is positioned circumferentially along surface 23 substantially equidistant between two circumferentially adjacent cams 21. Three cams 21 are formed circumferentially with respect to surface 23 and one positioning tab 120 is formed with respect to surface 23. Tab 120 is positioned substantially midway between two of the three cams 21. The three cams 21 formed along surface 23 are configured and dimensioned to effectively engage corresponding cams formed on strainer cover 26. Tab 120 is configured and dimensioned to interact with a corresponding notch formed on cover 26 to ensure that strainer housing 12 and cover 26 are permitted to interact in a single/predefined relative orientation. Thus, tab 120 is adapted to align with a receiving notch formed within a cam formed on cover 26 in order for cover 26 to properly align with strainer housing 12.

Figure 3:
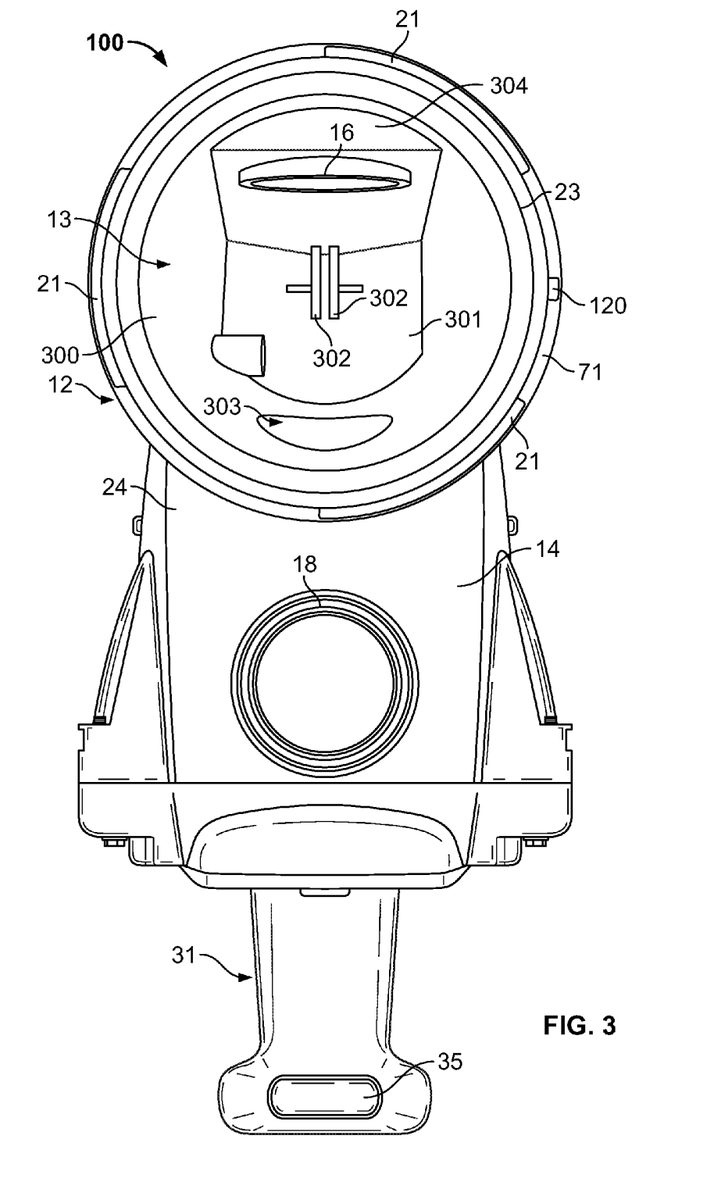
FIG. 3 is top side view of an exemplary pool pump associated with the present disclosure with the cover removed.

FIG. 3 is a top view of exemplary pump 100 with cover 26 and a strainer (shown in FIGS. 4-6) removed for clarity. Cams 21 and ridge 71 protrude radially with respect to surface 23. Three cams 21 are circumferentially spaced around outer surface 23 of strainer housing 12. Tab 120 also protrudes radially with respect to surface 23 and is positioned substantially equidistant between circumferentially adjacent ramped cams 21.

Cavity 13 of strainer housing 12 is defined by an inner surface 300 that is configured and dimensioned to allow for an exemplary strainer to fit securely therewithin. Inlet 16 provides for fluid entry into strainer housing 12. At least two strainer alignment features 302 are formed with respect to bottom surface 301 and are adapted to receive a cooperating fin associated with an exemplary strainer to securely restrain the strainer from unwanted movement during pump operation. A flow path 303 for allowing fluid communication between the strainer housing and the impeller housing is defined substantially opposite inlet 16. In an exemplary embodiment, a ramped ledge 304 is formed with respect to inner surface 300. Ramped ledge 304 is positioned above inlet 16 and is configured and dimensioned to provide structural support to a strainer positioned within strainer housing 12, i.e., to prevent unwanted movement of the strainer during pump operation.

FIG. 4 is a top view of exemplary pump 100 with an exemplary strainer cover 26 mounted with respect to strainer housing 12. Strainer cover 26 includes a substantially transparent/translucent lid 25 and is securely mounted with respect to strainer housing 12 by engaging the cams 21 formed on the top portion 22 of strainer housing 12 with complementary cams (not seen in FIG. 4) formed on cover 26. Two diametrically opposite handles 28 extend radially outward with respect to cover 26. Handles 28 are configured and dimensioned to allow a user to rotate cover 26 with respect to strainer housing 12, thereby engaging and disengaging cover 26 from strainer housing 12, e.g., to access strainer basket positioned therewithin. When cover 26 is fully assembled with respect to strainer housing 12, a seal is formed therebetween that substantially prevents fluid leakage and/or pressure loss therefrom. Based on the interaction between positioning tab 120 and a corresponding notch in strainer cover 26, handles 28 are necessarily perpendicular to the axis of pump 100 when the strainer cover 26/strainer housing 12 are in sealing engagement.

Strainer 400 generally defines a substantially mesh-like portion that includes a plurality of holes for filtration purposes. The holes allow fluid to pass in and out of strainer 400, while preventing larger items, such as sticks, leaves, debris and the like, from passing therethrough. Strainer 400 is configured and dimensioned to fit securely within cavity 13 such that the strainer's outer surface is substantially stepped away with respect to inner surface 300 for fluid passage therebetween.

FIG. 5 illustrates a partially exploded perspective view of exemplary pump 100. Strainer cover 26 includes an inner surface 50 and a U-shaped channel 75 that define a substantially circular geometry. A plurality (3) of inwardly directed cams 51 (also referred to as cooperating ramps) are formed with respect to inner surface 50 of cover 26. Each cam 51 defines a ramped surface 79 that is angled so as to cooperate with corresponding ramps 73 formed on cams 21. In an exemplary embodiment, cams 51 extend to the lower edge of cover 26.

At least one of the plurality of cooperating cams 51 on cover 26 defines a notch 520 for alignment and cooperation with tab 120 formed with respect to strainer housing 12. Tab 120 and cooperating notch 520 allow for mounting of cover 26 with respect to strainer housing 12 in only one relative orientation. In this way, the positioning of handles 28 relative to the remainder of pump 10/100 is controlled. In use, strainer cover 26 is brought into engagement with strainer housing 12 by aligning the positioning tab 120 with the corresponding positioning notch 520 formed in cam 51. The U-shaped channel 75 formed in the underside of lid 26 is brought into engagement with circumferential rim 77 of strainer housing 12 as tab 120 passes through notch 520. At this point, a positive pressure within strainer housing 12 would cause cover 26 to disengage from strainer housing 12. Of note, cams 51 pass between cams 21 as cover 26 is brought into engagement with strainer housing 12.

With rim 77 positioned within U-shaped channel 75, the user rotates cover 26 relative to strainer housing 12 in a clockwise direction. As cover 26 rotates relative to housing 12, ramped cam 51 engages ramped cam 21, thereby drawing cover 26 into closer/tighter engagement with housing 12. Rotational motion of cover 26 relative to strainer housing 12 is limited by tolerancing between the camming members 21/51 and outwardly directed ridge 71. Thus, the camming members 21/51 bring cover 26 into an interference engagement with ridge 71, thereby preventing further rotational motion of the cover 26. In addition, when such interference engagement is achieved, the U-shaped channel 75 is in sealing engagement with ridge 71 of strainer housing 12. The three cam pairs 21/51 substantially improve the sealing effect for purposes of pump 10/100 because the sealing forces are circumferentially distributed and balanced.

In an exemplary embodiment strainer 400 is positioned within cavity 13 of strainer housing 12. Strainer 400 defines a top side opening 404 to allow for efficient removal of items that may accumulate within strainer 400. In an exemplary embodiment, strainer 400 further includes an alignment fin 401 that extends along an inlet side 402. Alignment fin 401 is configured and dimensioned for secure positioning between strainer alignment features 302, as described with reference to FIG. 3. An inlet portion 403 that defines a substantially circular geometry is formed with respect to inlet side 402. Typically, fin 401 extends centrally from inlet portion 403, down inlet side 402, and across bottom side 406. Inlet portion 403 is typically configured and dimensioned to substantially cooperate with respect to inlet 16 formed on strainer housing 12, thereby facilitating fluid flow.

In an exemplary embodiment of the present disclosure, base 15 extends downwardly with respect to impeller housing 14 and abuts with base portion 42 that extends downward from impeller cover 41. A hole 36 is defined on base portion 42 that is configured, positioned and dimensioned to allow for a base securing feature 33 to pass through base portion 42 and engage rearwardly extending stand 31. Securing feature 33 can be a screw, bolt or the like, and functions to secure stand 31 in abutting relation with base portion 42. In this way, stand 31 provides structural support to pump 100 during pump operation.

Stand 31 typically includes a flange portion 38 that abuts against base portion 42 when engaged by securing feature 33. Securing feature 33 is received by a receiving chamber 37 formed within stand 31 and is adapted to cooperate with securing feature 33 to secure base portion 42 to stand 31. In an exemplary embodiment, stand 31 is made from a sturdy plastic material adapted to prevent undesired movement during pump operation.

FIG. 6 illustrates a side view of an exemplary strainer 400. A spaced ring 409 is formed circularly along the top side 404 of strainer 400. A ridge 407 extends downwardly from ring 409 along a portion of rear side 408 opposite inlet side 402. Ridge 407 and ring 409 are configured and dimensioned to ensure that strainer 400 is sufficiently spaced away from inner surface 300 of strainer housing 12 to allow for effective fluid movement through the mesh configuration of strainer 400. In an exemplary embodiment, strainer 400 further defines a cooperating ramped surface 405 positioned above cooperating inlet portion 403 to effectively abut against ramped ledge 304 of strainer housing 12. Strainer 400 is generally formed as an integral unit from a plastic material, although alternative strainer constructions and configurations may be employed without departing from the spirit or scope of the present disclosure.

Thus, the present disclosure provides advantageous pump designs and assemblies for use in fluid circulation systems. In particular, the present disclosure provides pump designs/assemblies that provide enhanced sealing engagement between a strainer cover and a strainer housing, such sealing engagement being effected by a plurality, e.g., three circumferentially spaced ramped cam pairs. A positioning tab/notch combination are also provided to facilitate positioning of opposed handles on the strainer cover relative to the remainder of the pump. The present disclosure also provides an advantageous base support that provides enhanced security and stability to a pump assembly.

Although the present disclosure has been described with reference to exemplary embodiments and implementations thereof, the disclosed assemblies are not limited to such exemplary embodiments/implementations. For example, additional earn pairs may be provided on the strainer housing and the strainer cover, e.g., four or five pairs, to further enhance the sealing engagement therebetween. In addition, the positioning tab and cooperating positioning notch may be reversed in positioning, i.e., the tab may be formed on the cover and the notch may be formed on the housing. Thus, as will be readily apparent to persons skilled in the art from the description provided herein, the disclosed assemblies are susceptible to modifications, alterations and enhancements without departing from the spirit or scope of the present disclosure. Accordingly, the present disclosure expressly encompasses such modification, alterations and enhancements within the scope hereof.

What is claimed is:

1. A pump for use with a fluid circulation system, comprising:
 (a) a strainer housing having an inner surface which defines a cavity for receiving a strainer;
 (b) a housing cover adapted to be removably mounted with respect to the strainer housing for forming a seal with respect to the strainer housing, the housing cover including a pair of opposed handles;

(c) at least three ramped cam members formed with respect to an outer surface of the strainer housing, the cam members being adapted to correspond to cooperating cam members formed along an inner surface of the strainer housing cover; and (d) at least three cooperating ramped cam members formed with respect to an inner surface of housing cover, the cooperating ramped cam members associated with the housing cover being configured and dimensioned for camming interaction with the ramped cam members associated with the strainer housing, wherein at least one of the cam members associated with the housing cover defines a positioning notch and the strainer housing defines at least one positioning tab that is configured and dimensioned to interact with the positioning notch.

2. A pump according to claim 1, wherein the at least three cam members associated with the strainer housing are integrally formed with respect to an outer surface thereof.

3. A pump according to claim 1, wherein the at least three cam members associated with the strainer housing are circumferentially spaced and positioned substantially equidistant from one another.

4. A pump according to claim 1, wherein the strainer housing defines an upper rim and the housing cover defines a substantially U-shaped channel on an underside thereof, said U-shaped channel being configured and dimensioned to receive said upper rim.

5. A pump according to claim 1, wherein the positioning notch and positioning tab are effective to align the pair of opposed handles in a desired orientation.

6. A pump according to claim 1, wherein the housing cover includes a frame and a lid mounted with respect to the frame.

7. A pump according to claim 6, wherein the lid is substantially transparent or translucent.

8. A pump according to claim 6, wherein the strainer housing defines an upper rim and the lid defines a substantially U-shaped channel on an underside thereof, said U-shaped channel being configured and dimensioned to receive and sealingly engage said upper rim.

9. A pump according to claim 1, wherein the strainer housing further defines a circumferential ridge on an outer surface that contributes to interference engagement between the strainer housing and the housing cover.

10. A pump for use with a fluid circulation system, comprising:

(a) a strainer housing having an inner surface which defines a cavity for receiving a strainer;

(b) a housing cover adapted to be removably mounted with respect to the strainer housing for forming a seal with respect to the strainer housing, the housing cover including a pair of opposed handles;

(c) at least three ramped cam members formed with respect to an outer surface of the strainer housing, the cam members being adapted to correspond to cooperating cam members formed along an inner surface of the strainer housing cover;

(d) at least three cooperating ramped cam members formed with respect to an inner surface of housing cover, the cooperating ramped cam members associated with the housing cover being configured and dimensioned for camminq interaction with the ramped cam members associated with the strainer housing; and (e) a stand adapted to be removably mounted with respect to base portions of an impeller housing and an impeller cover.

11. A pump according to claim 10, wherein the stand includes a flange portion adapted to abut against the base portion of the impeller cover, the flange portion defining at least one receiving chamber adapted to receive at least one base securing feature for removably mounting the stand with respect to the base portion of the impeller cover.

12. A pump according to claim 11, wherein the at least one base securing feature passes through the base portions of the impeller housing and the impeller cover and engages the at least one receiving chamber defined with respect to the motor stand.

13. A pump according to claim 12, wherein the stand mounted with respect to the base portions of the impeller housing and the impeller cover provides structural support to the pump.

14. A pump for use with a fluid circulation system, comprising:

(a) a strainer housing having an inner surface which defines a cavity for receiving a strainer;

(b) an inlet formed on a front side of the strainer housing adapted to allow fluid to enter the strainer housing; and (c) a housing cover adapted to be removably mounted with respect to the strainer housing for forming a seal with respect to the strainer housing, the housing cover having a pair of diametrically opposed handles extending radially with respect to the cover;

wherein a top portion of the strainer housing defines an opening adapted to allow access to the cavity defined by the inner surface of the strainer housing, the top portion having an outer surface adapted to cooperate with the strainer housing cover; wherein a plurality of cam members are integrally formed with respect to the outer surface of the top portion of the strainer housing, the cam members being adapted to correspond to cooperating cam members formed along an inner surface of the strainer housing cover;

wherein a positioning tab is integrally formed with respect to the outer surface of the top portion of the strainer housing, the positioning tab corresponding to a positioning notch formed with respect to the inner surface of the strainer housing cover.

15. A pump according to claim 14, wherein the outer surface of the top portion of the strainer housing includes three cam members integrally formed with respect to the outer surface, and the housing cover includes three cooperating cam members corresponding to the cam members included on the outer surface of the top portion of the strainer housing.

16. A pump according to claim 15, wherein the cam members formed with respect to the outer surface of the top portion of the strainer housing protrude radially outwardly with respect to the outer surface of the top portion of the strainer housing and the cooperating cam members formed with respect to the inner surface of the strainer housing cover protrude radially inwardly with respect to the inner surface of the strainer housing cover.

17. A pump according to claim 14, further comprising a stand adapted to be removably mounted with respect to base portions of an impeller housing and an impeller cover.

18. A pump for use with a fluid circulation system, comprising:

(a) a strainer housing having an inner surface which defines a cavity for hosting a strainer;

(b) an inlet formed on a front side of the strainer housing adapted to allow fluid to enter the strainer housing;

(c) a strainer housing cover adapted to be removably mounted with respect to the strainer housing for forming a seal with respect to the strainer housing, the strainer housing cover having a pair of diametrically opposed handles extending radially with respect to the cover;

(d) a top portion of the strainer housing defining an opening adapted to allow access to the cavity defined by the inner surface of the strainer housing, the top portion having an outer surface adapted to cooperate with the strainer housing cover;
(e) a plurality of cam members integrally formed with respect to the outer surface of the top portion of the strainer housing, the cam members being adapted to correspond to cooperating cam members formed along an inner surface of the strainer housing cover;
(f) an impeller housing integrally formed with respect to the strainer housing, the impeller housing defining an outlet on a top side of the impeller housing and the impeller housing is adapted to host an impeller;
(g) an impeller cover removably mounted with respect to the impeller housing, the impeller cover is adapted to cooperate with a motor adapted to drive the impeller, the impeller cover including a base portion of the impeller cover extending downwardly with respect to the impeller cover and adapted to abut against a base portion of the impeller housing extending downwardly with respect to the impeller housing; and
(h) a stand adapted to be removably mounted with respect to the base portions of the impeller housing and the impeller cover.

* * * * *

UNITED STATES PATENT AND TRADEMARK OFFICE
CERTIFICATE OF CORRECTION

PATENT NO. : 8,186,517 B2
APPLICATION NO. : 12/270349
DATED : May 29, 2012
INVENTOR(S) : Joel Brent Bowman

Page 1 of 1

It is certified that error appears in the above-identified patent and that said Letters Patent is hereby corrected as shown below:

Column 6, line 57, "A" should be deleted.

Column 11, line 61, "camminq" should be --camming--.

Signed and Sealed this
Thirty-first Day of July, 2012

David J. Kappos
*Director of the United States Patent and Trademark Office*